United States Patent
Jaspers

(10) Patent No.: US 7,305,141 B2
(45) Date of Patent: *Dec. 4, 2007

(54) CONTOUR FILTER FOR IMAGE SENSOR OUTPUT SIGNALS

(75) Inventor: Cornelis Antonie Maria Jaspers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 495 days.

This patent is subject to a terminal disclaimer.

(21) Appl. No.: 10/067,476

(22) Filed: Feb. 5, 2002

(65) Prior Publication Data

US 2002/0158979 A1    Oct. 31, 2002

(30) Foreign Application Priority Data

Feb. 6, 2001    (EP)    ................... 01200424

(51) Int. Cl.
 *G06K 9/40*    (2006.01)
 *G06K 9/00*    (2006.01)

(52) U.S. Cl. ..................................... 382/260; 382/167
(58) Field of Classification Search ................ 382/260, 382/167, 266, 300, 269
See application file for complete search history.

(56) References Cited

U.S. PATENT DOCUMENTS

| | | | |
|---|---|---|---|
| 5,285,267 A | 2/1994 | Lim | 348/663 |
| 6,263,102 B1* | 7/2001 | Jaspers | 382/162 |
| 6,697,110 B1* | 2/2004 | Jaspers et al. | 348/272 |
| 6,944,337 B2* | 9/2005 | Jaspers | 382/167 |

* cited by examiner

*Primary Examiner*—Yon J. Couso

(57) ABSTRACT

The present invention relates to digital image sensors and in particular to an aliasing free contour filter for RGB Bayer sensors. The filter (ZSB, 7) prevents an amplification of back folded aliasing artefacts and further eliminates green-green differences caused in the green color of the image sensor.

14 Claims, 5 Drawing Sheets

CONTOUR FILTER FOR IMAGE SENSOR OUTPUT SIGNALS

FIELD OF THE INVENTION

The present invention relates to digital image sensors and in particular to an contour filter for RGB Bayer sensor output signals.

BACKGROUND OF THE INVENTION

In digital cameras a lens is used to obtain light information from a scene. These light photons are converted to electrons by an image sensor consisting of a number of light sensitive elements. When using digital RGB still cameras, three image sensors are used to obtain color sensing for each color red, green and blue. In order to reduce both cost, weight and size of the camera it is possible to use one image sensor having an RGB Bayer filter array, where each pixel in the sensor array senses red, green or blue in a predefined pattern. This pattern is build up of alternating green, red columns and green, blue columns.

In FIG. 1 the color filter array of an RGB Bayer image sensor is shown. It is assumed that the sensor has square and contiguous pixels, this means that the resolution has become independent of the aspect ratio of the sensor and is equal for the horizontal and vertical direction. The sample structure of the RGB pixels is shown in FIG. 2. The pitch p is the distance between two neighbor pixels. Its inverse value represents the pixel or system clock frequency 'fs' in case of a single RGB output of the sensor, so fs=1/p. The sample frequency of each RGB color is inversely proportional to the shortest distance between the pixels of each RGB color. This results for the red and blue colors in a horizontal and vertical sample frequency called fsR and fsB, equal to ½ p=fs/2, and for green in a diagonal sample frequency fsG equal to $1/p\sqrt{2}=fs/\sqrt{2}$. Because fsR and fsB are equal this frequency is called fsRB.

For the sampled image it holds that the frequency spectrum of each color is repeated at multiples of the sample frequency of each color. The multiple sample frequencies are located on equal distances in a two-dimensional array. By means of the black dots in FIG. 3, the left-hand part of FIG. 3 showing a red and blue frequency array, and the right-hand part of FIG. 3 showing a green sample frequency array, a very limited number of multiple sample frequency points are shown. The grey areas N are Nyquist areas. Theoretically that number is infinite. If the frequency spectrums overlap aliasing is introduced. If each spectrum around a sample frequency point does not overlap the so called Nyquist theorem is fulfilled: i.e. the incoming frequencies of the scene, via the optical system and the integrating light sensitive part of a sensor pixel, should be lower than half the sample frequency of each color. This means that the maximum resolution that each color can offer is determined by half the sample frequency of each color. So for the red and blue colored pixels the maximum resolution in the horizontal and vertical direction is fsRB/2=fs/4, and in the diagonal direction $\sqrt{2}$*fs/4. For the green pixels the diagonal resolution has a maximum of fsG/2=fs/2$\sqrt{2}$ and due to the quincunx structure in the horizontal and vertical direction of fs/2.

Contour filtering is performed in order to obtain a contour signal that can be used to get a sharper image by enhancing the contour of the image. It is important that the contour filter does not interpret different RGB amplitudes as contours. Meaning that when filtering colored scene parts, having different RGB amplitudes, the output should be zeros.

When in a digital still camera a contour filter is applied a disadvantage is that the back folding aliasing artefacts described above will be enhanced, making those artefacts even more visible.

SUMMARY OF THE INVENTION

It is an object of the present invention to solve the above-mentioned problem by providing an improved contour filtering where a more sharpened picture without amplifying the aliasing artefacts is obtained.

Another problem using Bayer sensors is the so-called green-green differences. The different colored neighbors of a green pixel cause green-green differences or green non-uniformity, in RGB Bayer sensors in the vertical direction. In the vertical direction of a 'red' column a green pixel has only red neighbors, while in 'blue' column green has only blue neighbor pixels. Depending on the quality of the vertical color separation of the sensor, the green pixel can be modulated by the red and blue pixels due to electron charge in the silicon layer or light crosstalk in the color filter layer. If so, then for certain colored scenes this will result in a column wise green non-uniformity.

It is therefore a second object of this invention to provide a contour filter as mentioned above that also eliminate the green-green differences caused in the green color of the RGB Bayer image sensor.

The invention provides a contour filtering as defined in the independent claims. Advantageous embodiments are defined in the dependent claims.

In the present context, the pixel vales may, naturally, be provided in any form or order. The important factor is that they may be ordered and represented in a manner so that an array is provided representing the image.

Also, it should be noted that the zero switching needs not be a replacement with a value being exactly zero. A value being substantially smaller than the absolute value of remaining non-zero filter coefficients will normally suffice. However, the value of zero is normally desired—also due to the fact that natural numbers smaller than 10 are normally used as filter coefficients.

The invention further comprises a computer program comprising computer program code means adapted to perform all the steps of the method mentioned above when said program is run on a computer and a computer readable medium comprising the computer program.

These and other aspects of the invention will be apparent from and elucidated with reference to the embodiments described hereinafter.

BRIEF DESCRIPTION OF THE DRAWINGS

The present invention will now be explained in further detail with reference to the accompanying FIGS. in which.

DESCRIPTION OF PREFERRED EMBODIMENTS

The present invention relates to a contour filter for filtering an image signal from an RGB Bayer sensor without amplifying the aliasing artefacts in the image, meaning that it does not allow any contour in the red/blue and green aliasing domain.

The filter is a 5×5 and in a preferred embodiment the coefficients of the 5×5 aliasing free contour filter are:

| -0 | -1 | -2 | -1 | -0 |
|----|----|----|----|----|
| -1 | -0 | +2 | -0 | -1 |
| -2 | +2 | +8 | +2 | -2 |
| -1 | -0 | +2 | -0 | -1 |
| -0 | -1 | -2 | -1 | -0 | sigmawCR=8 sigmawCR is the factor by which the signal output of this contour filter has to be divided in order to achieve an almost unity signal amplitude.

It should be noted that it is not the coefficients of the filter which are important, it is the ratio between the coefficients. Any 5×5 contour filter in which the coefficients have a mutual ratio corresponding to the above can be used. Therefore any filter fulfilling the criteria below is within the current invention:

| -0  | -1x | -2x | -1x | -0  |
|-----|-----|-----|-----|-----|
| -1x | -0  | +2x | -0  | -1x |
| -2x | +2x | +8x | +2x | -2x |
| -1x | -0  | +2x | -0  | -1x |
| -0  | -1x | -2x | -1x | -0  |

It should also to be noted that a slight deviation (e.g. 25%, but preferably lower, such as 10% or 5% or less) in the ratio of the coefficients can be used, though it will affect the performance of the filter with respect to aliasing amplification.

Finally, when changing the coefficients, the value of sigmawCR also has to be changed correspondingly in order to maintain the almost unity signal amplitude.

Figure 4:
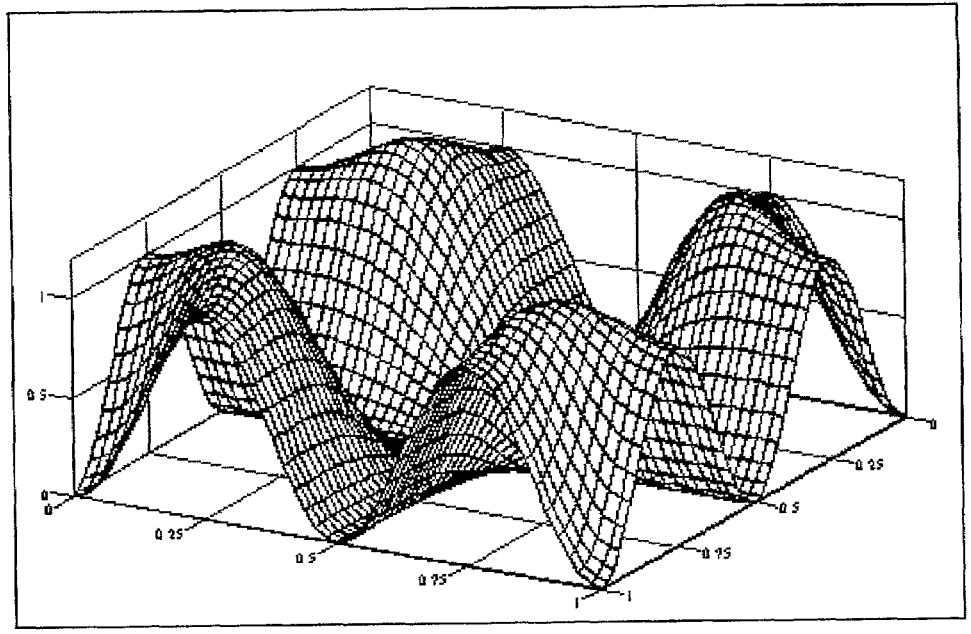
FIG. 4 shows the transfer characteristic of a 5×5 aliasing free contour filter.

The transfer characteristic of the filter according to the invention is shown in FIG. 4. The zero transfer on and between the RGB sample frequencies is the reason why this filter tends towards an aliasing free contour with a minimum of distortion. This effect was confirmed by the finding of the contour of a zone plate which also showed that there was no contour in the red/blue and green aliasing domain.

With more than just slight changes to some coefficients, as shown below, the resulting contour will differ completely and the requirement will not be fulfilled. The coefficients of a contour filter B has been chosen in such a way that the ratio between the coefficients differs from the filter according to this invention. The coefficients of contour filter B are:

| -0 | -1 | -1 | -1 | -0 |
|----|----|----|----|----|
| -1 | -1 | +2 | -1 | -1 |
| -1 | +2 | +8 | +2 | -1 |
| -1 | -1 | +2 | -1 | -1 |
| -0 | -1 | -1 | -1 | -0 | sigmawCR=8

Figure 5:
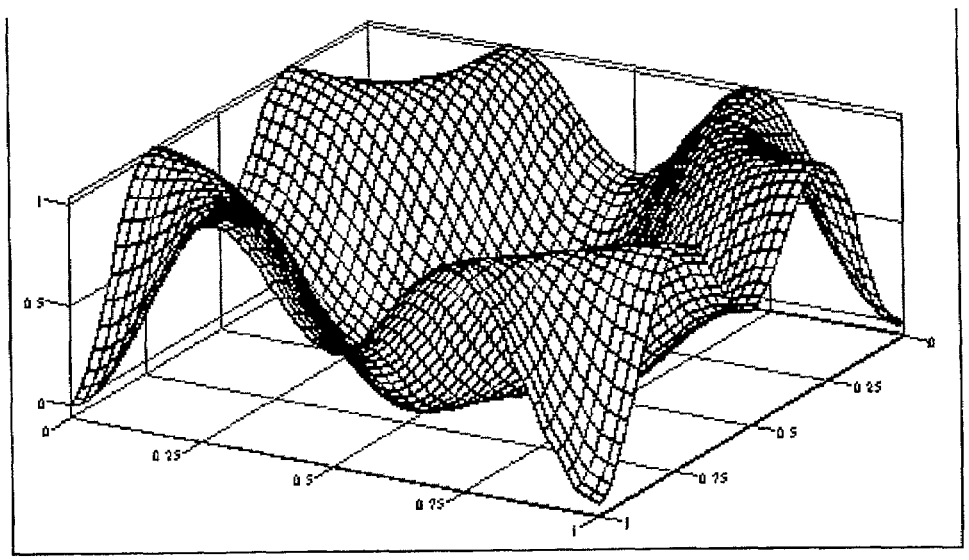
FIG. 5 shows the transfer characteristic of a contour filter B.

In FIG. 5 the transfer characteristics of contour filter B are shown, and it can be seen that it will not be able to remove the aliasing from the contour signal since the transfer between the RGB sample frequencies are not zero. This was confirmed with a zone plate which also showed that there were contour in the red/blue and green aliasing domain.

Now it has been shown that the filter according the invention solves the aliasing problem. However, in order to function properly no contour ('modulation') should occur in equal colored scene parts, although the RGB amplitudes will differ to a large extent there.

Figure 6:
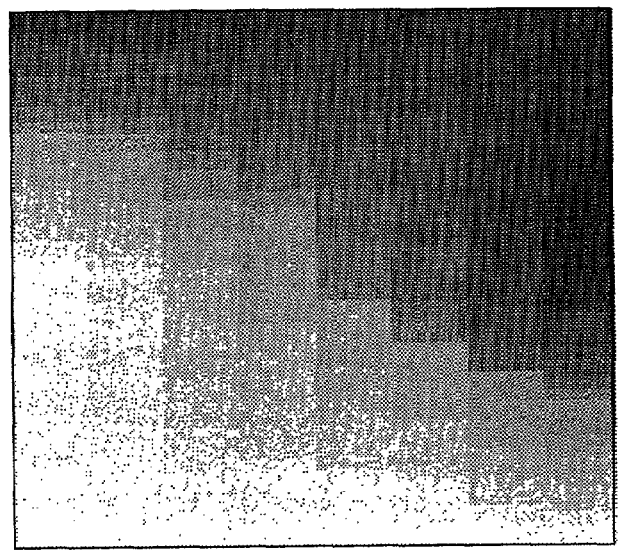
FIG. 6 shows a linear color bar scene.

A suitable figure to test this is the color bar scene in FIG. 6 which uses the maximum available color space and as a consequence offers the largest differences in RGB amplitudes. From the top to the middle the RGB amplitudes increase from 0-100%. Just beyond the middle the amplitudes drop to 90% after which the brightness of the RGB signals increases from 0-90%, resulting in a white color at the bottom line.

Figure 7:
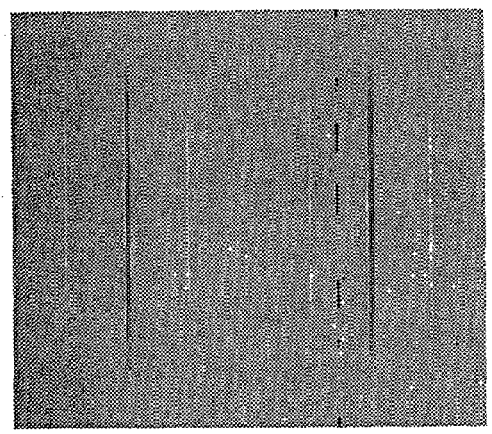
FIG. 7 shows the aliasing free contour signal on the left and the signal of the contour filter B on the right.
Figure 7:
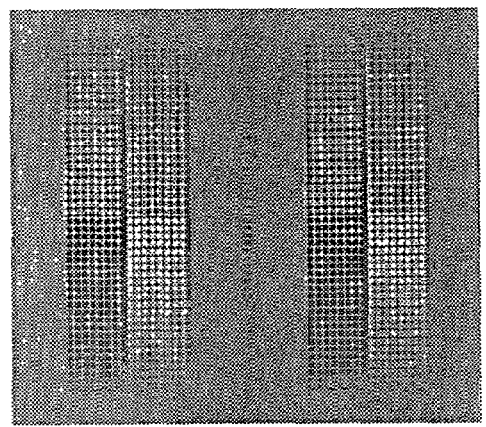

On the left side of FIG. 7 the result of the aliasing free contour is shown without any visible 'modulation' in the colored areas. On the right side the contour of contour filter B is shown with a clearly visible amount of undesired 'modulation'.

Additionally, tests have shown that the contour filter has no green-green differences. This can be shown by checking the filter according to rules that have to be fulfilled when designing contour filters without green-green differences.

The rules are:

1. The center coefficient in both the first array of filter coefficients and the second array of filter coefficients is zero, and The center green data are added to the filter later using the green signal of the reconstruction path. This center green has already a restored green uniformity as has been explained before.

2. The subtraction of neighboring diagonal filter coefficients in each of the first and second array of filter coefficients results in a zero contribution, This will average and as a consequence eliminate the green-green differences of the green pixels with vertical red and blue neighbors.

Finally, the combination of both filters should be checked in order to achieve a minimum of distortion. First their amplitude transfer should be checked and, if necessary, adapted for a minimal distortion in the total contour signal. Then, their amount of noise reduction by means of coring should possibly be matched by adjusting the coring level of each filters.

In order to check those rules for the aliasing free contour filter, its coefficients are splitted into weighting factors for 'center green is absent' and for 'center green is present'. When green is absent the following coefficients apply:

|  |  |  |  |  |
|---|---|---|---|---|
| −0 | −1 | −0 | −1 | −0 |
| −1 | −0 | +2 | −0 | −1 |
| −0 | +2 | −0 | +2 | −0 |
| −1 | −0 | +2 | −0 | −1 |
| −0 | −1 | −0 | −1 | −0 | sigmawCR=8

When green is present these coefficients apply:

|  |  |  |  |  |
|---|---|---|---|---|
| −0 | −0 | −2 | −0 | −0 |
| −0 | −0 | −0 | −0 | −0 |
| −2 | −0 | +8 | −0 | −2 |
| −0 | −0 | −0 | −0 | −0 |
| −0 | −0 | −2 | −0 | −0 | sigmawCR=8

The absolute value of the sum of the coefficients, sigmawCR, has already been adapted.

Figure 8:
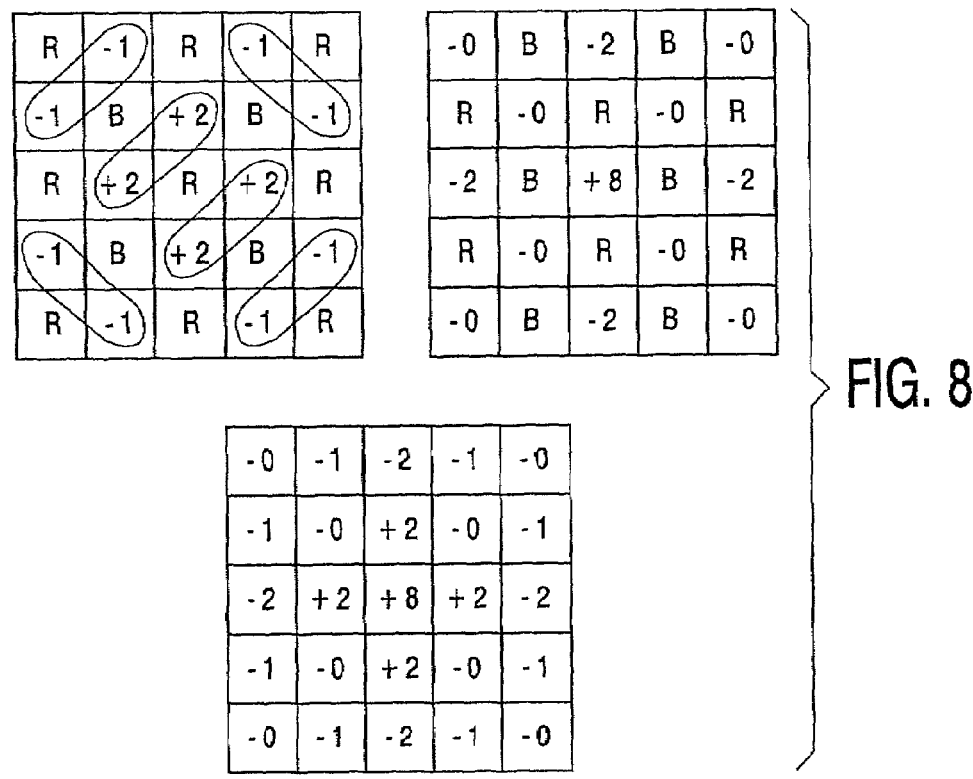
FIG. 8 shows the fulfillment of the extended rule 2 for a 5×5 array.

Simulation of only the filter for which green is present makes it, however, plain that it does eliminate the green-green differences. The explanation is that only non-zero coefficients are present at green locations with the same colored (red or blue) vertical neighbor. In FIG. 8 non-zero coefficients are only present at green locations with a red vertical neighbor. Consequently, (in low frequency scene parts) the involved green pixels will have the same error. The +8 coefficient and the four −2 coefficients will together eliminate this error to a zero green-green difference in the output signal.

This also means that rule 1 and 2 may be replaced by an alternative rule for the center green filter configuration which may be described as follows:

the sum of coefficients having the same first vertical neighbor color is zero and each filter coefficient with a second vertical neighbor color different from said first color is zero.

In more general terms this can be expressed as:

the sum of coefficients in a subgroup comprising every second row of said array of filter coefficients is zero and each filter coefficient not being a part of said subgroup is 0.

In FIG. 8 it can be seen that the contour filter according to the invention fulfils the above alternative rule.

Figure 1:
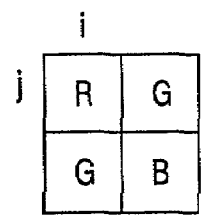
FIG. 1 shows an RGB Bayer luminance pixel.
Figure 2:
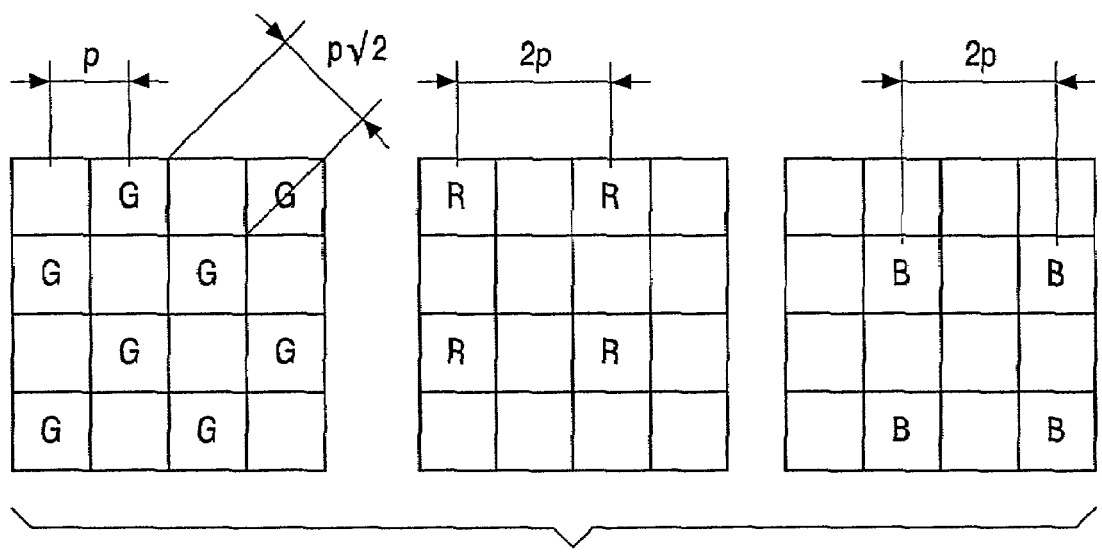
FIG. 2 shows the pitch of the RGB colors.
Figure 3:
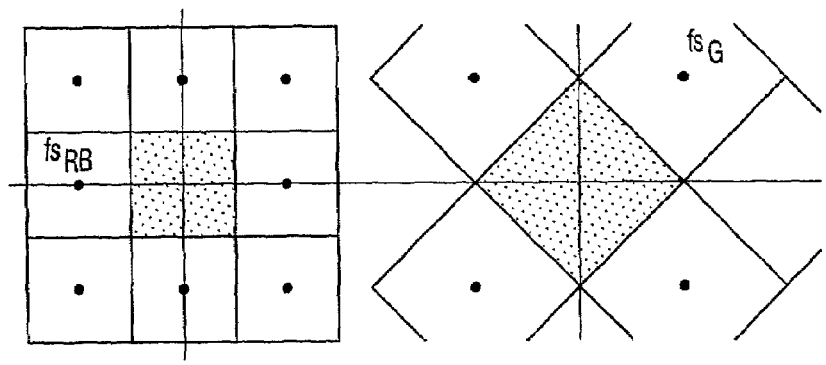
FIG. 3 shows RGB Bayer sample frequency array.

For a near white luminance signal in the reconstruction block, derived from the RGB pixels of the image sensor, the matrix and white balance parameters have to be taken into account. Since the matrix and white balance are located after the reconstruction, some adaptation of the incoming red and blue colors is necessary. For this purpose the parameters SmartGcntrlR and SmartGcntrlB are used to control the red and blue amplitudes in order that they match with green and result in a near white luminance signal Yn. Referring to FIG. 1, the following applies to this Yn-signal in case of red and blue pixels:

$Yn[i,j]=SmartGcntrlR*red$ $Yn[i+1,j+1]=SmartGcntrlR*blue$

In case of green pixels Yn is equal to green.

$Yn[i+1,j]=green$ $Yn[i,j+1]=green$

Figure 9:
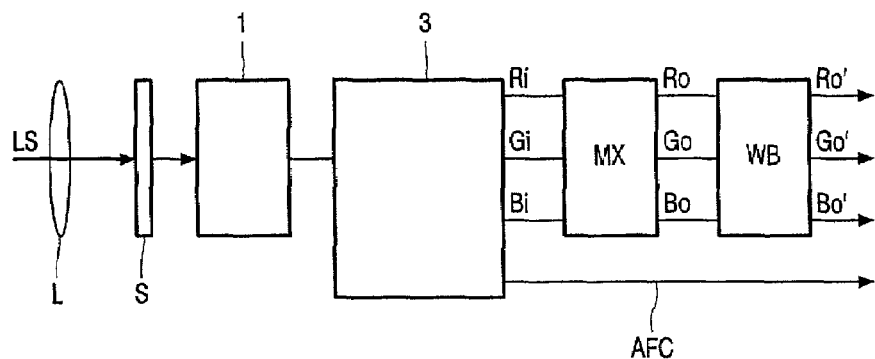
FIG. 9 shows the RGB and contour reconstruction, matrix and white balance of a RGB Bayer color camera.

In FIG. 9 a simplified block diagram is shown with the RGB and aliasing free contour reconstruction, followed by the matrix and the white balance. This block diagram is used to define the parameters in the next formulas for the calculation of SmartGcntrlr/B. Light LS from a scene is passed to an RGB Bayer sensor S thru a lens L. An output signal from the sensor S is applied to a CDS (correlated double sampling, agc (automatic gain control) and ADC (analog to digital conversion) processing block 1. An output of the processing block 1 is applied to an RGB reconstruction and parallel contour processing block 3. The processing block 3 outputs reconstructed RGB signals Ri, Gi and Bi, as well as an aliasing-free contour signal AFC. The reconstructed RGB signals Ri, Gi and Bi are applied to a matrix circuit MX that produces signals Ro, Go and Bo, which are applied to a white balance circuit WB to furnish output signals Ro', Go' and Bo'.

A correction of each RGB Bayer color sensor's primary colors into the EBU primaries which are accustomed in worldwide television sets and PC monitors is necessary. The correction is realized with a matrix which requires nine multipliers.

$$\begin{bmatrix} Ro \\ Go \\ Bo \end{bmatrix} = \begin{bmatrix} a11 & a12 & a13 \\ a21 & a22 & a23 \\ a31 & a32 & a33 \end{bmatrix} \times \begin{bmatrix} Ri \\ Gi \\ Bi \end{bmatrix}$$

Ro, Go, Bo are the output RGB signals of the matrix and Ri, Gi, Bi the input signals.

With the white balance after the matrix, the RGB signals become:

$Ro'=awbR \cdot Ro$ $Go'=Go$ $Bo'=awbB \cdot Bo$ where awbR and awbB are the white balance parameters. (According to the World Gray Assumption method (WGA), awbR=totalGreen/totalRed and awbB=totalGreen/totalBlue, where totalRed, totalGreen and totalBlue represent the total of the RGB color amplitudes measured over the whole scene.) Both actions, the matrix together with the white balance, offer the desired white reproduction. The Ro', Go', Bo' signals now guarantee an EBU color reproduction.

For a proper near white luminance signal Yn the opposite has to be done. Therefore, imagine a scene with colors according to the EBU color space and a color temperature equal to D65 white. With the inverse matrix of the one shown below, the color space of the sensor is achieved:

$$\begin{bmatrix} Rii \\ Gii \\ Bii \end{bmatrix} = \begin{bmatrix} b11 & b12 & b13 \\ b21 & b22 & b23 \\ b31 & b32 & b33 \end{bmatrix} \times \begin{bmatrix} Ri \\ Gi \\ Bi \end{bmatrix}$$

where Rii, Gii, Bii represent the colors of an EBU scene and Ri, Gi, Bi the colors of the sensor.

For the luminance signal Yn only the white reproduction of the inverse matrix is of interest, being represented by the sum of the matrix coefficients of each color.

$\Sigma Rii=b11+b12+b13$ $\Sigma Gii=b21+b22+b23$ $\Sigma Bii=b31+b32+b33$

In addition, the color temperature of the scene need not be D65 white. Inclusive an arbitrary color temperature the sum of the matrix coefficients becomes:

$$\Sigma Riwb = R\text{presetgain} \cdot b11 + G\text{presetgain} \cdot b12 + B\text{presetgain} \cdot b13$$

$$\Sigma Giwb = R\text{presetgain} \cdot b21 + G\text{presetgain} \cdot b22 + B\text{presetgain} \cdot b23$$

$$\Sigma Biwb = R\text{presetgain} \cdot b31 + G\text{presetgain} \cdot b32 + B\text{presetgain} \cdot b33$$

where Xpresetgain (X=R, G or B) represents the gain factors for transferring D65 white into that arbitrary color temperature. (For D65 white all Xpresetgain parameters are one.) To the SmartGcntrlR/B parameters used in Yn[i,j] and Yn[i+1, j+1] (see formula below) applies that:

$$SmartGcntrlR = \frac{\sum Giwb}{\sum Riwb}$$

$$SmartGcntrlB = \frac{\sum Giwb}{\sum Biwb}$$

The parameter ΣGiwb is used as nominator because the green amplitude is regarded as a reference. This applies to the white balance as well.

Now the above formulas can be written in such a way that the measured white balance parameters awbR/B may be applied. Knowing that $$\frac{G\text{presetgain}}{R\text{presetgain}} = awbR = \frac{G\text{total}}{R\text{total}}$$

$$\frac{G\text{presetgain}}{B\text{presetgain}} = awbB = \frac{G\text{total}}{B\text{total}}$$

therefore $$\sum Riwb = G\text{presetgain} \cdot \left(\frac{b11}{awbR} + b21 + \frac{b13}{awbB}\right)$$

$$\sum Giwb = G\text{presetgain} \cdot \left(\frac{b21}{awbR} + b22 + \frac{b23}{awbB}\right)$$

$$\sum Biwb = G\text{presetgain} \cdot \left(\frac{b31}{awbR} + b23 + \frac{b33}{awbB}\right)$$

Since the ΣXiwb-values are divided in the above, the parameter Gpresetgain is not important because Gpresetgain/Gpresetgain=1. Therefore, the next formula is sufficient for calculating the desired ΣXiwb-values:

$$\sum Riwb = \left(\frac{b11}{awbR} + b21 + \frac{b13}{awbB}\right)$$

$$\sum Giwb = \left(\frac{b21}{awbR} + b22 + \frac{b23}{awbB}\right)$$

$$\sum Biwb = \left(\frac{b31}{awbR} + b23 + \frac{b33}{awbB}\right)$$

Now a luminance signal Yn has become available with equal RGB signal amplitudes for white scene colors, thereby being independent of the sensor matrix and the color temperature of the scene. This signal Yn may be applied for the aliasing free contour filter.

The question raised is whether Yn really should be composed with the SmartGcntrlRlB parameters for the red and blue pixels and the answer depends on the desired performance. If the best performance of the aliasing free contour filter is wanted, then the SmartGcntrlR/B parameters should be applied. If a somewhat lower performance is accepted, i.e. some distortions are allowed, then those parameters can be neglected.

Figure 10:
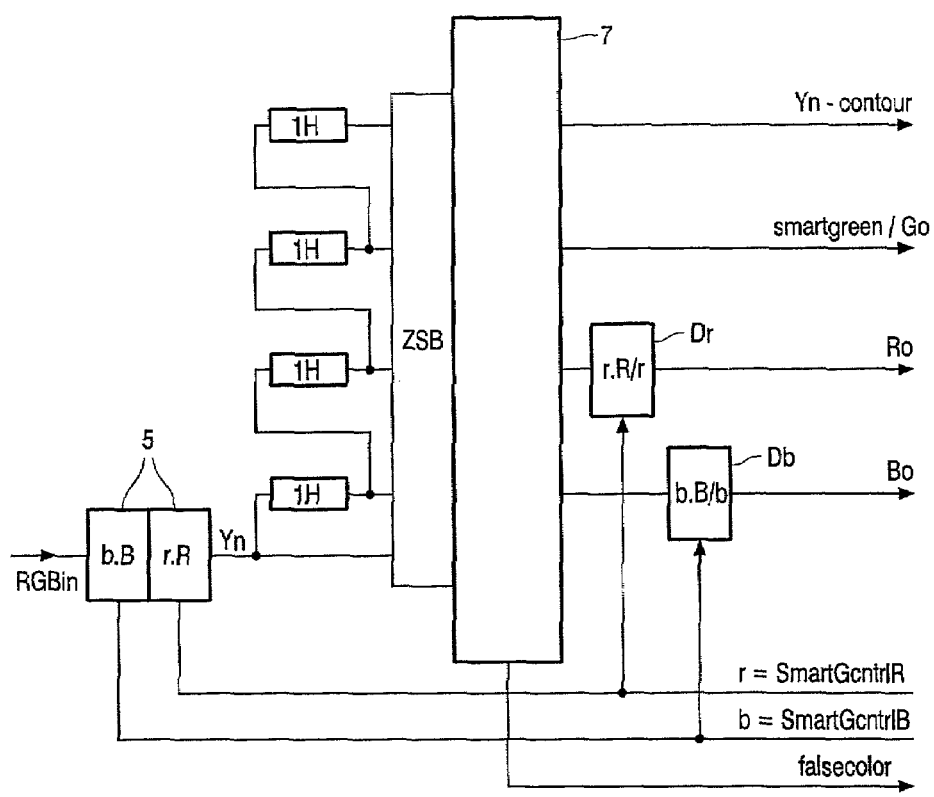
FIG. 10 shows a block diagram for RGB reconstruction and the aliasing free parallel contour.

FIG. 10 shows the block diagram of the RGB reconstruction and the aliasing free parallel contour filtering. Yn is the multiplexed RGB-signal of the sensor where R has been multiplied with SmartcntrlR, and B with SmartcntrlB, in a preprocessing block 5. This Yn-signal is used for the 5×5 parallel contour only, while Yn is splitted into three colors, red=R*SmartcntrlR, green=G and Blue=B*SmartcntrlB, via the zero switchbox ZSB. Then, a conventional Laplacian RGB reconstruction method with or without smart green, but in any case with green-uniformity restoration, is applied and, if desired, with the red and blue false color detector in a 5×5 parallel contour & 3×3 RGB reconstruction with/without smartgreen and green uniformity restoration & false color detection processing block 7. If smart green (smartgreen1) is applied, then the so called RBc signal in the median filter already fits R*SmartGcntrlR and B*SmartGcntrlB.

By dividing the reconstructed red and blue signals in dividers Dr and Db by SmartGcntrlR and SmartGcntrlB, respectively, the original red and blue sensor amplitudes are restored. This means that the usually applied matrix, white balance and gamma functions can be maintained. In digital circuit design multipliers are preferred to dividers. Therefore, in order to avoid the divider circuits, the best way is to let the computer of the camera calculate 1/SmartcntrlR and 1/SmartcntrlB. Then, via two separate wires, those values can be offered to two multipliers. The Ro-amplitude then becomes equal to the R-amplitude of the input signal (SmartcntrlR*R*(1/SmartcntrlR=R). The very same applies to the Bo-amplitude.

It should be noted that the parameters SmartcntrlR/B have been determined in a measurement cycle before the photograph is taken or in a continuous way in case of video mode.

Although the present invention has been described in connection with the preferred embodiment, it is not intended to be limited to the specific form set forth herein. On the contrary, it is intended to cover such alternatives, modifications, and equivalents, as can be reasonably included within the scope of the invention as defined by the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A contour filter for providing contour information from an array of pixel values representing an image, said array comprises a first and a second group of pixels, the first group of pixels representing part(s) of the image optically filtered with a filter having a first color, and the second group of pixels representing part(s) of the image optically filtered with one or more filters having one or more second colors each pixel in the first group having a vertical and a horizontal neighboring pixel of the second group, said contour filter comprising:
  means for converting said array of pixel values to a zero switched array, where the pixel values of the pixels in the second group are replaced by zero,
  means for contour filtering said zero switched array and outputting said contour information,
  wherein the contour filtering means comprises:
  means for calculating, for each pixel in the zero switched array, a filtered pixel value, said calculation being performed by using an array of filter coefficients having mutual ratios being substantially defined by:

| | | | | |
|---|---|---|---|---|
| $-0 \pm A$ | $-1x \pm B$ | $-2x \pm C$ | $-1x \pm D$ | $-0 \pm E$ |
| $-1x \pm F$ | $-0 \pm G$ | $+2x \pm H$ | $-0 \pm I$ | $-1x \pm J$ |
| $-2x \pm K$ | $+2x \pm L$ | $+8x \pm M$ | $+2x \pm N$ | $-2x \pm O$ |
| $-1x \pm P$ | $-0 \pm Q$ | $+2x \pm R$ | $-0 \pm S$ | $-1x \pm T$ |
| $-0 \pm U$ | $-1x \pm V$ | $-2x \pm X$ | $-1x \pm Y$ | $-0 \pm Z$ | where x is a real number and the value of each of A, B, C, D, E, F, G, H, I, J, K, L, M, N, O, P, Q, R, S, T, U, V, X, Y, Z is between 0 and 0.25x, and
  means for multiplying the pixel value of the actual pixel with the 8x±M coefficient and the remaining filtering coefficients with correspondingly positioned pixel values in the zero switched array and finally summing the resulting values.

2. The contour filter as claimed in claim 1, where the value of each of A, B, C, D, E, F, G, H, I, J, K, L, M, N, O, P, Q, R, S, T, U, V, X, Y, Z is between 0 and 0.1x.

3. A method of providing contour information from an array of pixel values representing an image, said array comprises a first and a second group of pixels, the first group of pixels representing part(s) of the image optically filtered with a filter having a first color, and the second group of pixels representing part(s) of the image optically filtered with one or more filters having one or more second colors, each pixel in the first group having a vertical and a horizontal neighboring pixel of the second group, said method comprising the steps of:
  converting said array of pixel values to a zero switched array, where the pixel values of the pixels in the second group are replaced by zero; and
  contour filtering said zero switched array and outputting said contour information, wherein the contour filtering step comprises the sub-steps:
  calculating, for each pixel in the zero switched array, a filtered pixel value, said calculation being performed by using an array of filter coefficients having mutual ratios being substantially defined by:

| | | | | |
|---|---|---|---|---|
| $-0 \pm A$ | $-1x \pm B$ | $-2x \pm C$ | $-1x \pm D$ | $-0 \pm E$ |
| $-1x \pm F$ | $-0 \pm G$ | $+2x \pm H$ | $-0 \pm I$ | $-1x \pm J$ |
| $-2x \pm K$ | $+2x \pm L$ | $+8x \pm M$ | $+2x \pm N$ | $-2x \pm O$ |
| $-1x \pm P$ | $-0 \pm Q$ | $+2x \pm R$ | $-0 \pm S$ | $-1x \pm T$ |
| $-0 \pm U$ | $-1x \pm V$ | $-2x \pm X$ | $-1x \pm Y$ | $-0 \pm Z$ | where x is a real number and the value of each of A, B, C, D, E, F, G, H, I, J, K, L, H, N, O, P, Q, R, S, T, U, V, X, Y, Z is between 0 and 0.25x; and
  multiplying the pixel value of the actual pixel with the 8x±M coefficient and the remaining filtering coefficients with correspondingly positioned pixel values in the zero switched array and finally summing the resulting values.

4. The method claimed in claim 3, where the value of each of A, B, C, D, E, F, G, H, I, J, K, L, M, N, O, P, Q, R, S, T, U, V, X, Y, Z is between 0 and 0.1x.

5. The method as claimed in claim 3, where said filtering is performed in parallel with a interpolation process, said interpolating process being a process where either pixels corresponding to pixels from said first group of pixels are interpolated in positions of said array only being represented by a pixel from said second group of pixels, or pixels corresponding to pixels from said second group of pixels are interpolated in positions of said array only being represented by a pixel from said first group of pixels.

6. A computer program comprising computer program code means implementing the method of claim 3 when said program is run on a computer.

7. A computer readable medium comprising a computer program as claimed in claim 6.

8. A color camera comprising: a sensor having a color filter array; and
  a contour filter as claimed in claim 1.

9. The contour filter as claimed in claim 1, where the value of each of A, B, C, D, E, F, G, H, I, J, K, L, M, N, O, P, Q, R, S, T, U, V, X, Y, Z is between 0 and 0.05x.

10. The contour filter as claimed in claim 1, where the value of each of A, B, C, D, E, F, G, H, I, J, K, L, M, N, O, P, Q, R, S, T, U, V, X, Y, Z is between 0 and 0.01x.

11. The contour filter as claimed in claim 1, where the value of each of A, B, C, D, E, F, G, H, I, J, K, L, M, N, O, P, Q, R, S, T, U, V, X, Y, Z is at least substantially zero.

12. The method as claimed in claim 3, where the value of each of A, B, C, D, E, F, G, H, I, J, K, L, M, N, O, P, Q, R, S, T, U, V, X, Y, Z is between 0 and 0.05x.

13. The method as claimed in claim 3, where the value of each of A, B, C, D, E, F, G, H, I, J, K, L, M, N, O, P, Q, R, S, T, U, V, X, Y, Z is between 0 and 0.01x.

14. The method as claimed in claim 3, where the value of each of A, B, C, D, E, F, G, H, I, J, K, L, M, N, O, P, Q, R, S, T, U, V, X, Y, Z is at least substantially zero.

* * * * *